United States Patent [19]

Euverard

[11] Patent Number: 4,869,200

[45] Date of Patent: Sep. 26, 1989

[54] ADJUSTABLE WET FILM THICKNESS APPLICATOR CAPABLE OF FORMING FILMS OF UNIFORM THICKNESS AND NON-UNIFORM THICKNESS

[75] Inventor: Maynard R. Euverard, Williamsburg, Va.

[73] Assignee: Paul N. Gardner Company, Inc., Pompano Beach, Fla.

[21] Appl. No.: 208,504

[22] Filed: Jun. 20, 1988

[51] Int. Cl.$^4$ .............................................. B29C 39/00

[52] U.S. Cl. .................................... 118/200; 118/100; 118/204; 118/256; 118/413; 425/458

[58] Field of Search ............... 118/413, 100, 102, 108, 118/120, 200, 204, 207, 241, 242, 252, 256; 425/224, 364 R, 374, 87, 458, 169, 173, 383-385, 404; 264/299

[56] References Cited

U.S. PATENT DOCUMENTS

| | | | |
|---|---|---|---|
| 95,974 | 10/1869 | Benton | 118/413 |
| 2,054,448 | 9/1936 | Russell | 118/413 |
| 2,295,394 | 9/1942 | Fordyce et al. | 118/413 |
| 2,303,120 | 11/1942 | Greaves-Walker | 118/413 |
| 2,526,991 | 10/1950 | Biddle | 118/413 |
| 2,711,098 | 6/1955 | Ames | 118/413 |
| 2,746,075 | 5/1956 | Gardner | 118/413 |
| 3,050,776 | 8/1962 | Kopper | 425/364 |
| 3,203,021 | 8/1965 | Pelick | 118/413 |
| 4,299,789 | 11/1981 | Giesbrecht | 425/224 |

*Primary Examiner*—Willard Hoag

*Attorney, Agent, or Firm*—Burns, Doane, Swecker & Mathis

[57] ABSTRACT

A wet film applicator is movable across a surface such that a blade edge extending transversely of the direction of movement and supported with a clearance above the surface causes a film of flowable substance, positioned ahead of the blade edge, to be spread as a film over the surface. The blade is adjustable in height so as to raise and lower opposite ends of the blade by the same amount for spreading films with selected constant thickness. The blade is also adjustable in height so as to raise and lower opposite ends of the blade by different amounts for spreading wedge-shaped films at selected shapes.

13 Claims, 1 Drawing Sheet

ADJUSTABLE WET FILM THICKNESS APPLICATOR CAPABLE OF FORMING FILMS OF UNIFORM THICKNESS AND NON-UNIFORM THICKNESS

BACKGROUND OF THE INVENTION

The present invention relates to a wet film applicator which is manually moved across a surface to cause a flowable substance to be spread in the form of a thin film across the surface.

Wet film applicators of that type are employed in the testing of substances such as paint for example, for particular characteristics such as color, opacity, gloss, flexibility, toughness, ratio power (hiding power), weatherability, chemical resistance, etc. It is important that the thickness or depth of the test film be consistent from one film-spreading operation to the next so that proper comparisons can be made. In certain tests, it is also necessary that the film thickness be uniform, whereas in other tests, it is necessary that the thickness be non-uniform, i.e., a so-called wedge-shaped film. A wedge-shaped film is useful, for example, in testing hiding power of a substance, because the depth at which the film is able to cover an underlying pattern can be discerned.

Various types of wet film applicators have been conventionally utilized. For example, so called "fixed-gate" applicators comprise two side walls and a transverse blade rigidly interconnecting the side walls. The area bordered by the side walls and blade defines a reservoir disposed ahead of the blade for confining a pool of a flowable substance to be tested. The lower, beveled edge of the blade is spaced above the lower edges of the side plates to define a clearance between the blade edge and the surface. Thus, when the applicator is moved in a forward direction of movement, the flowable substance is spread by the blade to a thickness controlled by the clearance.

It is desirable that the height of the clearance be varied by raising or lowering the blade, whereby a so-called adjustable clearance type of applicator can be employed. Such adjustment might be made in some applicators by inserting or removing shims between the blade and side walls. In other applicators, the blade can be raised or lowered by actuation of micrometer screws which extend through a top rail overlying the blade. In still another applicator, the blade can be adjustably slid along a pair of parallel runners having inclined faces; the runners are mounted on a one-piece block (i.e., are rigidly interconnected), and the blade is held in positions of adjustment by a set screw.

It has also been proposed to provide a blade which is stepped along its length to define blade sections of different clearance. Such a blade could, for example, be utilized to spread a film in the form of strips of different thickness. When such a film is spread over a pattern of lines, the coating thickness for complete opacity can be determined by observing which film strip just hides the lines.

As a variation of the above-described stepped blade, the blade edge may be inclined from one side wall to the other so as to define a continuously varying clearance. Such an arrangement creates the wedge-shaped film discussed earlier, and thereby defines a larger number of clearances as compared to a stepped blade. However, the clearances which can be tested are limited to the particular inclination of the blade edge which is usually fixed.

It would be desirable to provide an applicator which is of simplified construction and yet capable of providing films of uniform thickness and non-uniform thickness, and which provides a blade height adjustment feature in connection with both types of film.

SUMMARY OF THE INVENTION

The present invention relates to a wet film applicator of the type which is movable across a surface such that a blade edge extending transversely of the direction of movement and support with a clearance above the surface causes a film of flowable substance, positioned ahead of the blade edge, to be spread as a film over the surface. The blade is adjustable in height so as to raise and lower opposite ends of the blade by the same amount for spreading films with selected constant thickness. The blade is further adjusted in height so as to raise and lower opposite ends of the blade by different amounts for spreading wedge-shaped film with selected inclination.

Preferably, the applicator includes a pair of side members to which the blade is adjustably mounted. Each of the side members includes a lower surface-engaging edge. The blade is displaceable relative to the side members in the direction of movement, and the side members are displaceable relative to each other in the direction of movement.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
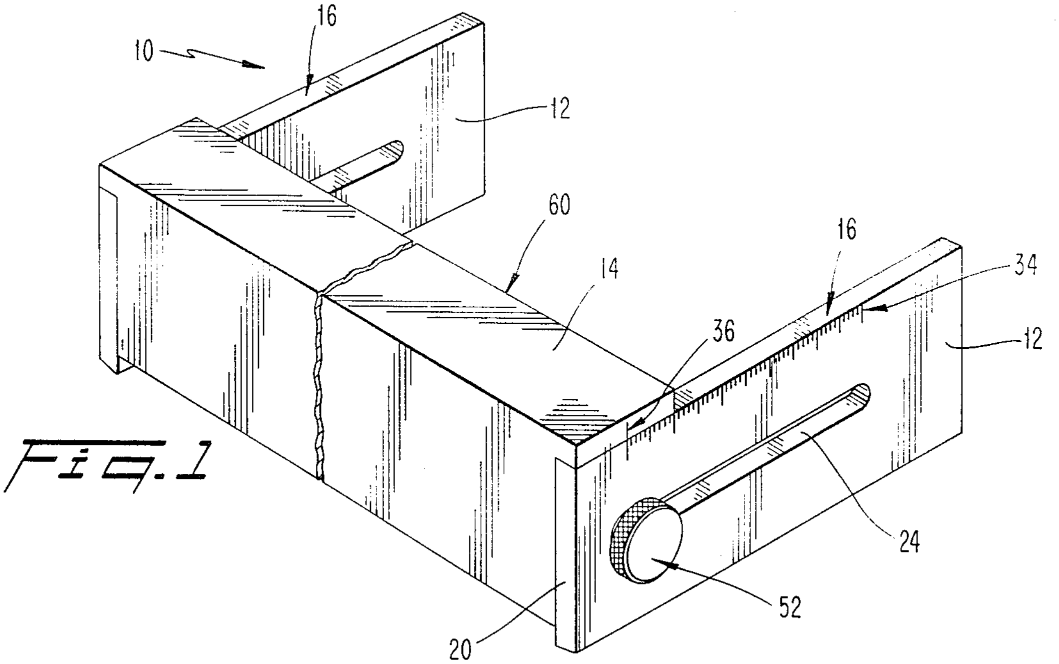
FIG. 1 is a top perspective view of a wet film applicator according to the present invention.
Figure 2:
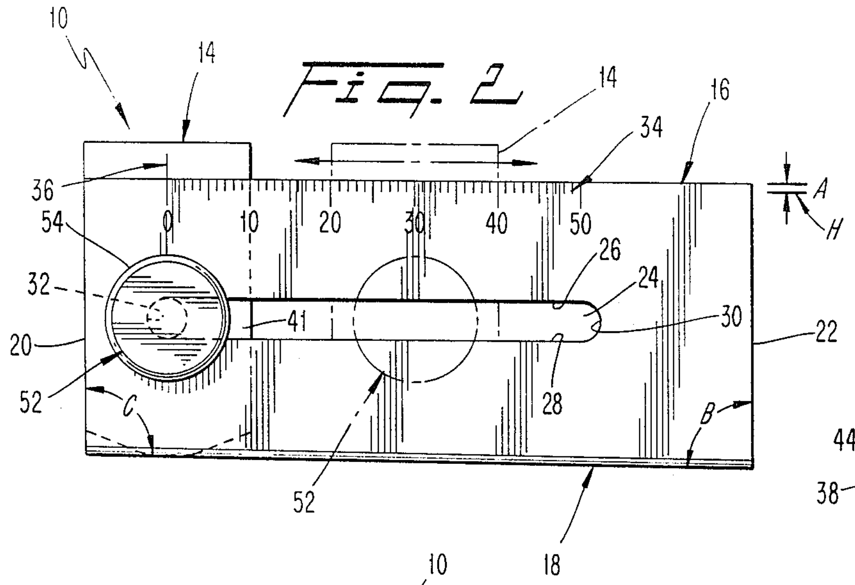
FIG. 2 is a side elevational view of the wet film applicator, with the blade depicted in adjusted position in phantom lines.
Figure 3:
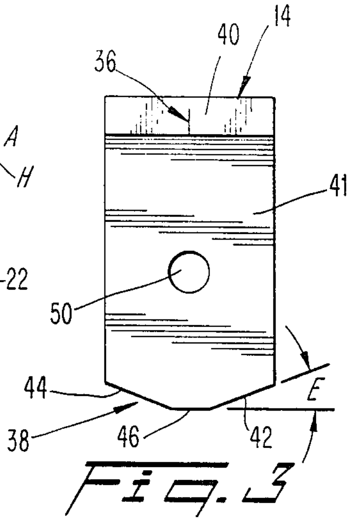
FIG. 3 is a side elevational view of a blade component of the applicator.

A wet film applicator 10 according to the present invention comprises first and second side plates 12 and a blade 14 interconnecting the side plates 12. The side plates 12 are mirror images of one another, each comprising upper and lower longitudinal edges 16, 18, a pair of upright end edges 20, 22 and a longitudinal slot 24 disposed therebetween. The upper and lower edges 16, 18 of each blade are non-parallel, i.e., the upper edge 16 is slightly inclined by an acute angle A (i.e., 1 to 2 degrees) relative to horizontal H. The end edges 20, 22 preferably are disposed perpendicular to the upper edge and thus form different angles B, C with the lower edge 18. For example, in one preferred embodiment, angle C is 91.146°, angle B is 88.854°, and angle A is 1.146°.

Figure 4:
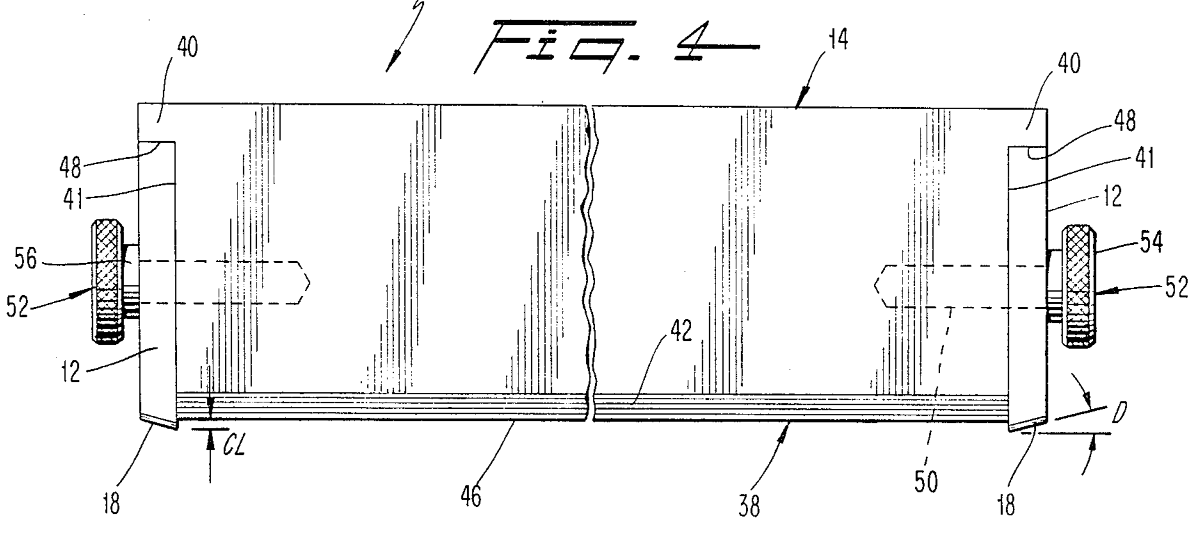
FIG. 4 is a front elevational view of the applicator.

Each lower edge 18 is beveled (see FIG. 4) so as to form an angle D opening away from the opposite side wall, i.e., a bevel of about 50 is preferred. This establishes line contact between the lower edge 18 and the surface on which the film is to be made, so as to create a more reliable seal for retaining the flowable substance being spread. This eliminates the possibility of measuring errors occurring as a result of the side plate riding on the wet film instead of on the surface itself. An additional advantage resulting from the presence of the bevel D will be explained hereinafter with reference to the spreading of a wedge-shaped film.

Each slot 24 is formed by upper and lower edges 26, 28, preferably oriented parallel to the upper surface 16. The slot 24 includes front and rear terminal ends 30, 32.

A graduated scale 34 is imprinted or embossed along the upper edge 16 of each side plate which cooperates with an indicator line 36 on the blade 14.

The blade 14 is of T-shaped construction as viewed from front-to-rear (FIG. 4) and includes a lower clearance edge 38 and a pair of lateral ears 40 disposed at the tops of upright faces 41. The lower edge 38 extends perpendicular to the longitudinal or front-to-rear direction and is beveled along front-and-rear faces 42, 44 of the blade in a conventional manner, each bevel forming an acute angle E, preferably 20°. A short flat portion 46 of the blade lower edge 38 forms the clearance edge which defines the film thickness. The ears include lower edges 48 adapted to slide longitudinally along the upper edges 16 of respective side plates 12.

A pair of threaded holes 50 are formed in the upright end faces 41 of the blade for receiving a pair of set screws 52. The set screws 52 are sized to fit through the slots 24 in the side plates 12 and include manual actuating knobs 54. By loosening the set screws, the blade 14 can be moved longitudinally relative to the side plates 12, and the side plates 12 can be moved longitudinally relative to one another. By tightening the set screws, washers 56 are compressed between the knobs 54 and the side plates 12 to affix the blade 1 relative to the side plates 12 and affix the side plates 12 relative to each other.

It will be appreciated that when the lower edges 18 of the side plates are resting upon a horizontal surface, the blade upper edges 16 are inclined relative to horizontal by angle A. Thus, by sliding the blade 14 longitudinally along the upper edges 16, the clearance CL between the blade lower edge 18 and the surface (see FIG. 4) is changed. The actual clearance can be read by referring to the reference line 36 relative to the scale 34 on either of the side plates 12. In this fashion, the thickness of a film applied by the applicator can be varied by sliding the blade 14 along the side plates 12, and then longitudinally advancing the applicator 10 across the surface with a flowable material disposed ahead of the blade within a reservoir 60 defined by the side plates 12 and the blade 14. An infinite number of constant film thicknesses can be spread in this manner.

In the event that it is desired to form a wedge-type film, i.e., a film whose thickness varies from one end of the blade to the other, it is merely necessary to loosen the set screws 52 and move one of the side plates 12 longitudinally relative to the other and relative to the blade 14. When the set screws 52 are then tightened, the clearances CL at the respective ends of the blades will be different and can be determined by viewing the scales on the side plates. It will be appreciated that the inclination of the blade can be adjusted to any desired value in this manner to apply wedge-shaped films with different inclinations.

When the blade is adjusted to spread a wedge-shaped film, i.e., when the blade is tilted relative to horizontal, the side plates will also be tilted to maintain surface contact between the upper edges 16 of the side plates and the lower edges 48 of the ears 40. By beveling the lower edges 18 of the side plates such that the inner margins (as opposed to the outer margins) of those edges make line contact with the surface, it is assured that the side plate located adjacent the low-clearance end of the blade can pivot about such line contact without significantly changing the blade clearance at such low clearance end. In contrast, if the lower edge was horizontal, or if the beveling was such as to create line contact at the outer margin of the edge 18, then the low-clearance end of the blade could be raised appreciably in response to tilting of the side plate, thereby the actual clearance would differ appreciably from the clearance indicated by the associated scale.

In accordance with the present invention, there is provide a wet film thickness applicator which can produce, as desired, a film of uniform thickness or non-uniform thickness. In either instance, the blade is adjustable to vary the height or inclination of the blade. The applicator is of simplified construction and easy to manipulate.

Although the present invention has been described in connection a preferred embodiment of the invention, it will be appreciated by those skilled in the art that modifications, additions, substitutions and deletions not specifically described may be made without departing from the spirit and scope of the invention as defined in the appended claims.

What is claimed is:

1. A wet film applicator of the type which is movable across a surface such that a blade edge extending transversely of the direction of movement and supported with a clearance above said surface causes a film of flowable substance, positioned ahead of the blade edge, to be spread as a film over said surface, said blade being adjustable in height so as to raise and lower opposite ends of said blade by the same amount for spreading films with selected constant thickness, said blade being also adjustable in height so as to raise and lower opposite ends of said blade by different amounts for spreading wedge-shaped films with selected inclination, said applicator comprising a pair of side members to which said blade is adjustably mounted, each of said side members including a lower surface-engaging edge for engaging said surface, each said surface-engaging edge being beveled in a direction away from the other side member, whereby an inner margin of each surface-engaging edge makes contact with said surface.

2. An applicator according to claim 1, wherein said blade is displaceable relative to said side members in said direction of movement, and said side members are displaceable relative to each other in said direction of movement.

3. A wet film applicator of the type which is movable across a surface such that a blade edge extending transversely of the direction of movement and supported with a clearance above the surface causes a film of flowable substance, positioned ahead of the blade edge, to be spread as a film over the surface, said applicator comprising:

first and second side plates spaced apart in a direction transversely of said direction of movement, each side plate extending in said direction of movement and containing a lower surface-engaging edge for engaging said surface and a blade-supporting edge disposed above said surface-engaging edge, said blade-supporting edge being inclined relative to said surface-engaging edge in said direction of movement such that one end of said blade-supporting edge is at a lower elevation than the opposite end thereof, a blade extending transversely of said direction of movement, a lower edge thereof defining said blade edge, said blade including opposite ends lying on said blade-supporting edges of said first and second side plates, respectively, said blade being slidable relative to said side plates along said blade-supporting surfaces in said direction of movement to vary said clearance of said blade edge above the surface, said side plates being movable relative to one another in said direction of movement to incline said blade edge from end to end such that one end thereof is at a lower elevation than the opposite end, whereby a wedge-shaped film of the flowable substance will be formed on the surface, and locking means for releasably affixing said blade relative to said side plates.

4. An applicator according to claim 3, wherein said blade supporting edge comprises an upper edge of each of said side plates.

5. An applicator according to claim 3, wherein each of said side plates includes a graduated scale along each of said blade supporting edges.

6. An applicator according to claim 3, wherein each of said surface-engaging edges is beveled in a direction away from the other of said surface-engaging edges, whereby an inner margin of each surface-engaging edge makes contact with the surface.

7. A wet film applicator of the type which is movable across a surface such that a blade edge extending transversely of the direction of movement and supported with a clearance above said surface causes as film of flowable substance, positioned ahead of the blade edge, to be spread as a film over said surface, said blade being adjustable in height so as to raise and lower opposite ends of said blade by the same amount for spreading films with selected constant thickness, said blades being also adjustable in height so as to raise and lower opposite ends of said blade by different amounts for spreading wedge-shape films with selected inclination, said applicator including a pair of side members to which said blade is adjustably mounted, each of said side members including a lower surface-engaging edge for engaging said surface across which said applicator is moved, said blade being displaceable relative to said side members in said direction of movement, and said side members being displaceable relative to each other in said direction of movement.

8. An applicator according to claim 7, wherein said blade is slidable along surfaces of said side members which are inclined relative to horizontal.

9. An applicator according to claim 8, wherein a graduated scale is disposed adjacent each of said surfaces.

10. An applicator according to claim 8, wherein said surfaces of said side members comprise upper edges thereof.

11. An applicator according to claim 10 including first securing means for securing said blade fixedly to one of said side members and second securing means for securing said blade fixedly to the other of said side members, said first and second securing means being actuable independently of one another.

12. An applicator according to claim 11, wherein each of said first and second securing members comprises a manually,actuable set screw engageable between said blade and a respective one of said side members.

13. An applicator according to claim 12, wherein each set screw extends through a slot in said respective side member, said slot extending in said direction of movement.

* * * * *